United States Patent [19]

Phillips et al.

[11] 4,071,658

[45] Jan. 31, 1978

[54] GLASS FOR METAL SEAL

[75] Inventors: Paul Millard Phillips, Sugar Grove, Pa.; John Gleason Donaldson, Tustin, Calif.

[73] Assignee: GTE Sylvania Incorporated, Stamford, Conn.

[21] Appl. No.: 747,362

[22] Filed: Dec. 3, 1976

[51] Int. Cl.² .................. B32B 15/16; B32B 15/18; B32B 15/20
[52] U.S. Cl. .................. 428/555; 428/552; 428/630; 428/677; 428/684
[58] Field of Search .............. 428/553, 554, 552, 555, 428/682, 684, 630, 677

[56] References Cited

U.S. PATENT DOCUMENTS

| | | | |
|---|---|---|---|
| 1,575,994 | 3/1926 | Laise | 428/630 |
| 2,555,877 | 6/1951 | Doran | 428/630 |
| 3,284,174 | 11/1966 | Zimmer | 428/630 |
| 3,475,144 | 10/1969 | Lamb | 428/630 |

FOREIGN PATENT DOCUMENTS 1,147,522  4/1969  United Kingdom .............. 428/630

*Primary Examiner*—Arthur J. Steiner
*Attorney, Agent, or Firm*—Norman J. O'Malley; John C. Fox; Donald R. Castle

[57] ABSTRACT

A composite metallic article for effecting a seal with glass, said article comprising a nickel-iron alloy core portion, a low carbon steel alloy sheath portion bonded to the core, and a uniformly thick shell portion of a glass-wetting material bonded about the sheath. A method for making the article is also disclosed.

7 Claims, 8 Drawing Figures

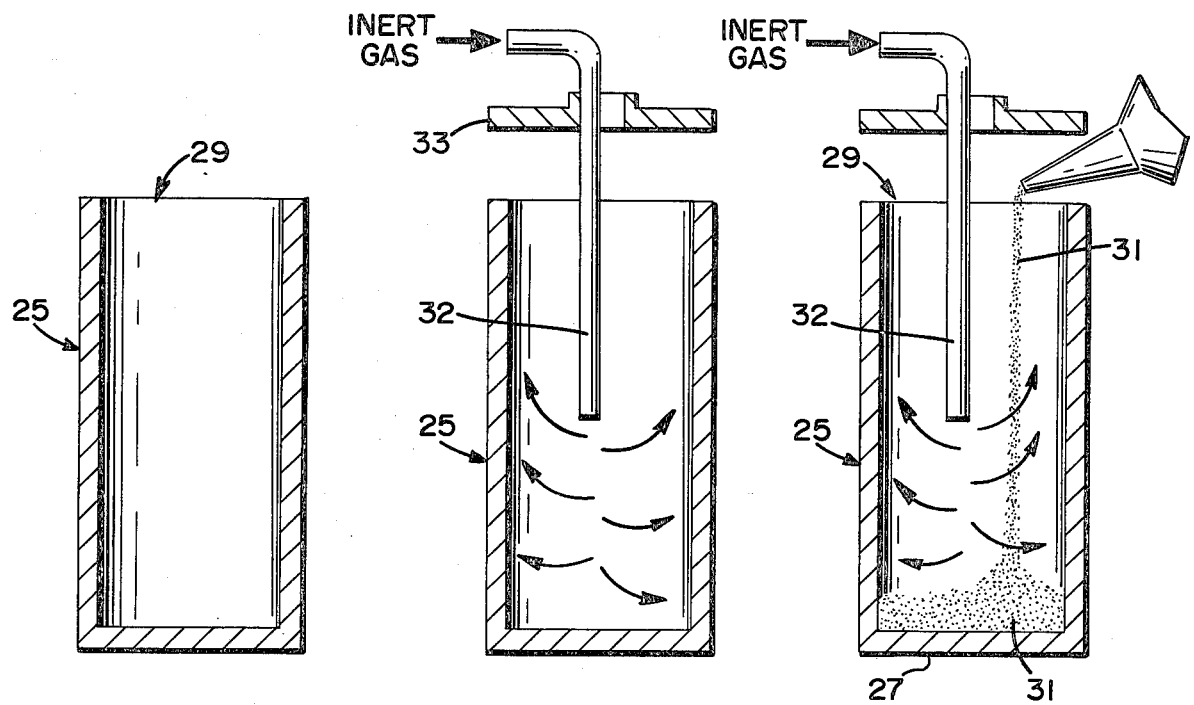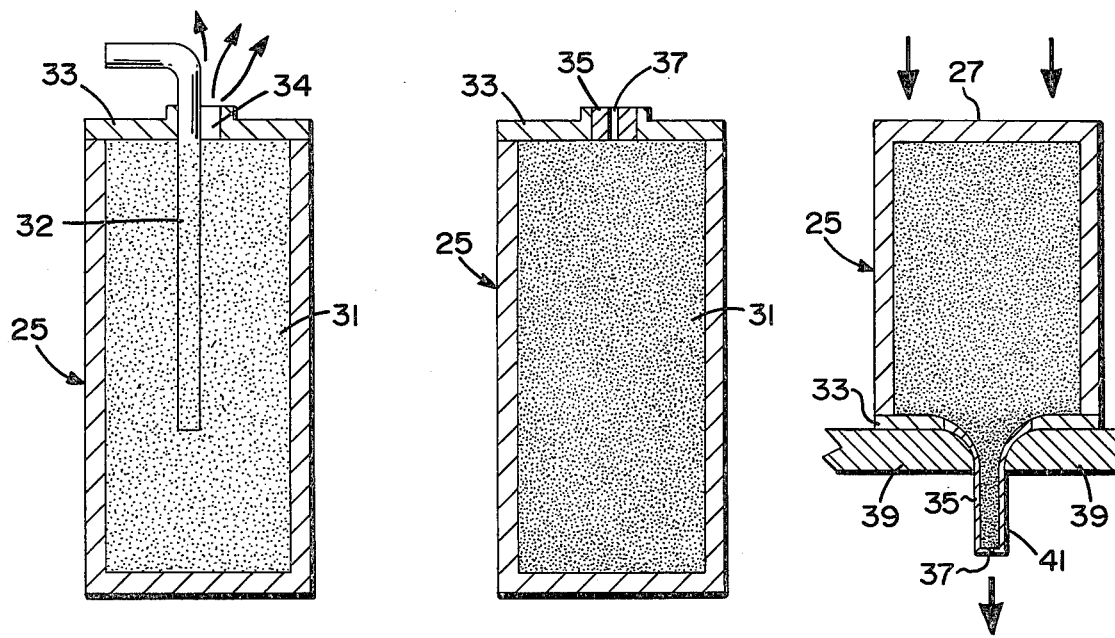

GLASS FOR METAL SEAL

BACKGROUND OF THE INVENTION

This invention relates to metal-glass seals and more particularly to composite metallic articles which are capable of being sealed within glass materials in a vacuum-tight manner.

The invention further relates to methods of making composite metallic articles.

Perhaps the best known composite metal glass-sealing material on the market today is sold under the trade name "Dumet" and consists of a nickel-iron core sheathed in a copper sleeve or shell. The copper constitutes about 21 to 25 percent of the total weight of the material and is usually affixed about the nickel-iron core by swaging, welding, molten dipping, etc. One significant problem with "Dumet" has centered around the bond between the core and sleeve portions. The substantial difference in the coefficients of thermal expansion between the respective portions of the "Dumet" has on occassion contributed to interface separations, cracks, and similar voids particularly when the article was subjected to the elevated temperatures and compression pressures typical of some glass sealing operations.

A second problem inherent in a cylindrically-shaped composite article which consists of two metallic materials having widely different thermal expansions concerns the relatively large differentials between radial and longitudinal (axial) thermal expansions when the article is subjected to the aforementioned glass sealing processes. "Dumet" normally averages approximately 2° variations under such conditions when measured with a commonly known testing device, the polariscope. Such variations in expansion can adversely affect a proper "match" between glass and composite article, resulting in cracks or similar voids in the glass portion of the product.

Still another problem of using "Dumet" as a glass-sealing article is one of cost, particularly when considering the relatively high prices of copper and copper products.

It is believed therefore that a glass-sealing composite metallic article which overcomes the above disadvantages of "Dumet" and similar composite articles would constitute an advancement in the art.

It is further believed that a method for making said article would represent an art advancement.

OBJECTS AND SUMMARY OF THE INVENTION

It is a primary object of the present invention to provide a glass-sealing composite metallic article which obviates many of the disadvantages of known prior art composites.

It is another object of the invention to provide a method for making a composite article for use in glass-sealing applications.

In accordance with one aspect of the invention, there is provided a composite metallic article capable of effecting a vacuum seal to glass. The article comprises a central core portion of a wrought nickel-iron alloy, a uniformly thick sheath portion of a low carbon steel alloy, and a uniformly thick shell portion of a glass wetting material.

According to another aspect of the invention, there is provided a method for making a glass-sealing composite metallic article, the method comprising the steps of: (a) providing a tubular sheath of low carbon steel alloy; (b) filling the sheath through an open end with prealloyed nickel and iron powders; (c) affixing a cover having at least one small opening therein to the open end of the sheath; (d) heating the sheath; (e) reducing the heated sheath member to form a composite metallic article having a central core portion of a wrought nickel-iron alloy and a sheath portion of a low carbon steel alloy; and (f) bonding a uniformly thick shell of a glass wetting material about said sheath portion.

BRIEF DESCRIPTION OF THE DRAWINGS

FIGS. 2–7 represent the preferred steps in producing a composite metallic article.

DETAILED DESCRIPTION OF THE PREFERRED EMBODIMENTS

For a better understanding of the present invention, together with other and further objects, advantages and capabilities thereof, reference is made to the following disclosure and appended claims in connection with the above-described drawings.

Figure 1:
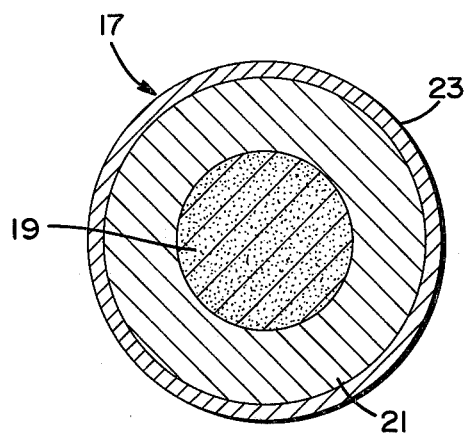
FIG. 1 represents a preferred embodiment of the present invention.

In FIG. 1 there is shown a composite metallic article 17 in accordance with one embodiment of the invention. As will be described, a preferred use for article 17 is for effecting a vacuum seal in glass. Article 17 is shown as comprising a substantially central core portion 19 which is comprised of a wrought nickel-iron alloy and a surrounding sheath portion 21 which is comprised of a low carbon steel alloy.

As stated, core 19 is of a wrought nickel-iron alloy. Accordingly, the nickel portion of the core comprises about 42 percent by weight with the balance of the core containing iron. Sheath 21 is of a substantially uniform thickness and is bonded about core 19. The preferred cross-sectional configuration for article 17 is cylindrical, said configuration utilized in most glass-sealing applications.

As will be understood with further description, core portion 19 is preferably produced from prealloyed nickel and iron powders. Sheath 21 is preferably of a low carbon steel of the plain carbon variety and preferably comprises about 15 to 35 percent by weight of article 17. Acceptable plain carbon steel alloys for use in sheath 21 include those having AISI designations C1006, C1008, and C1010. These steels typically include less than 0.10% by weight carbon as well as the following elements:

Manganese — 0.25–0.60%
Phosphorous — 0.04%
Sulfur — .05%
Iron — Balance

Steel alloys having less than 0.10% by weight carbon are preferred for the reasons previously given. As is understood, the function of shell 23 is to permit positive glass wetting between the shell and the glass composition in which article 17 is sealed. The preferred glass wetting material is copper and comprises about 2–7% by weight of article 17.

The article of the invention possesses an average coefficient of thermal expansion within the range of about 7.5 to 10.0 cm/cm/° C $\times 10^{-6}$ over a temperature range of from about 25–400° C. This range is acceptable for many soft and hard glass applications.

The present invention represents several distinct advantages over the well known product "Dumet". The following chart depicts typical glass sealing properties for several (5) samples having cylindrical cross-sectional configurations with 0.020 outside diameters. The readings were taken on the well known testing device, the polariscope. It can readily be seen that the differentials in radial and longitudinal (axial) expansions for the present invention are significantly less than those for corresponding samples of "Dumet".

| Sample | Ni-Fe CORE Steel Sheath (C1006) Cu Shell | | "Dumet" | |
|---|---|---|---|---|
|  | Radial | Longitudinal | Radial | Longitudinal |
| 1 | 10° | 11° | 15° | 12° |
| 2 | 12° | 11° | 12° | 12° |
| 3 | 12° | 11° | 15° | 13° |
| 4 | 10° | 10° | 14° | 11° |
| 5 | 11° | 11° | 14° | 12° |
| Average | 11° | 10.8° | 14° | 12° |

As shown above, the difference in radial and longitudinal expansions for an article of the invention having a nickel-iron core, low carbon steel sheath, and copper shell averaged only 0.2° while corresponding properties of "Dumet" averaged ten times this amount, or 2°. This is considered significant with regard to glass-sealing applications because the smaller the differential between radial and axial expansion in a sealing article, the greater the opportunity for a proper "match" with the glass.

The above characteristics result from the utilization of adjoining metallic materials having relatively close coefficients of thermal expansion. Nickel-iron material having about 42% by weight nickel with the balance iron has an expansion coefficient of about $6.5$ cm/cm/° C $\times 10^{-6}$. C1006 steel alloy has a coefficient of expansion of about $13.7$ cm/cm/° C $\times 10^{-6}$ which is much closer than that of copper having a coefficient of about $18.0$ cm/cm/° C $\times 10^{-6}$.

It is also understood that the articles of the invention represent a substantial cost savings over "Dumet" and similar composites which employ relatively large percentages of copper, e.g. 21–25%. As stated, the embodiment of the invention as depicted in FIG. 1 uses only about 2–7% by weight copper. Also, the cost of powdered NiFe is substantially less than that of the solid rod used in "Dumet."

FIGS. 2–7 illustrate the various steps utilized to produce a glass-sealing composite article such as that of FIG. 1. The preferred steps comprise providing a tubular sheath member 25 of a low carbon steel alloy, e.g. plain carbon, wherein the sheath has a closed end 27 and an open end 29. Sheath 25 is filled through open end 29 to an established level with prealloyed nickel and iron powders 31, said filling shown in FIG. 4. As an added step to the method shown, sheath 25 may be filled with an inert gas, e.g. argon, prior to the addition of powders 31 to provide a non-oxidizing atmosphere within the sheath. The above step is depicted in FIG. 3 and includes the introduction of an elongated pipe 32 within sheath 25. If a gas is introduced, it is preferred to continue filling sheath 25 during the addition of powders 31 and for a short time afterward. In doing so, it is assured that a detrimental oxidizing atmosphere is not present within the tubular sheath. The preferred materials for sheath 25 and powders 31 are those previously defined for article 17.

A cover member 33 is now affixed to open end 29 of sheath 25, said cover preferably of a steel alloy similar to that used for the sheath. When the aforementioned inert gas is employed in the method, it is preferred to provide an orifice 34 therein to facilitate positioning of pipe 32. It is also understood with regard to the method described that powdered metals 31 can be introduced through orifice 34 rather than in the manner depicted in FIG. 4.

Cover member 33 is secured to open end 29 preferably by welding. It is understood that other means of securement may be possible, including brazing, etc. With cover 33 secured to sheath 25, a plug 35 is securedly positioned within the cover. Welding may also be used here to provide said securement. The sealed article including sheath 25, powders 31, and cover 33 is now suitable for shipping and for storage.

The next step in the method includes heating the article to a preestablished temperature sufficient to sinter powders 31. Prior to this step, however, a small opening 37 (FIG. 6) is provided within cover 33. Opening 37 permits escape of any internal gases built up during the above heating step and the subsequent reduction process. If the article is to be heated and reduced immediately after filling of the powders 31, plug 35 can include the small opening 37 therein. If not, this opening is provided after the desired shipping and/or storage period. The preferred location for opening 37 is within plug 35.

The preferred temperature for heating the article is within the range of about 500 to 1000° C for a period of about 1–2 hours. With the article at approximately this temperature, the article is reduced to a desired size. The preferred method of reduction is hot extrusion, e.g. hydrostatic and is represented in the drawings at FIG. 7. The article is passed through extrusion dies 39 and the resulting wire 41 produced. At this stage, wire 41 is essentially nonporous and at approximately 100% densification.

Wire 41 may now be subsequently reduced through a series of reducing steps, e.g. drawing, rolling, swaging, etc. to produce still smaller diameter components. Typically, final size wiring as produced in this manner have diameters within the range of from about 0.010 to about 0.030 inch.

A typical tubular sheath 25 as originally provided at the start of the described method has an external diameter of approximately 10 inches. After the desired reduction step (FIG. 7), the resulting wire 41 has a diameter of about 0.75 inch.

The aforementioned glass wetting material, e.g. copper, is now added to the wire after the final reducing steps described above. Said material is bonded to the reduced sheath 25 in a uniformly thick manner, preferably using a plating or similar procedure.

Figure 8:
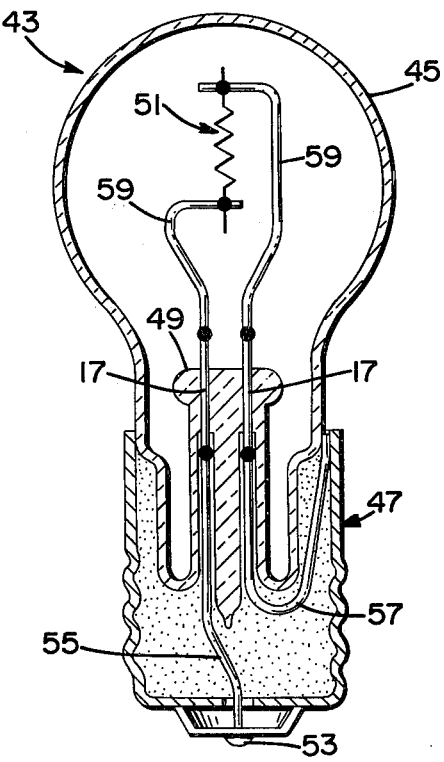
FIG. 8 shows one of the uses for the composite metallic article of the invention.

It is understood of course that the article as described above will have an electrical resistance substantially greater than a copper sheathed nickel-iron core wire of similar dimensions. "Dumet", having 21–25% by weight copper, has an average electrical resistance of about 50–70 ohms cir. mils/ft. Typical resistance for 0.010–0.030 diameter articles of the invention have resistances of about 175–180 ohms cir. mil./ft. Accordingly, a preferred usage for articles of the invention is within electrical applications wherein a conductive element having a greater resistance is utilized. Such an application is shown in FIG. 8, that being an electric lamp 43. Typical electric lamps include an envelope 45 of glass composition, a metallic screw base 47, a glass mounting portion 49, a highly resistant filament 51, and a contact member 53. A circuit is provided within lamp 43 by electrically connecting in series filament 51 with base 47 and contact 53.

The composite metallic article 17 is vacuum sealed within the lamp's glass mounting portion 49. Typically, a copperclad lead wire 55 electrically joins contact 53 with one of the articles 17. Another lead wire 57, e.g. nickel, is employed to join base 47 with the remaining spacedly positioned article. Filament 51, preferably tungsten, is retained in position by a pair of support leads 59. Because the nickel lead 57 serves as a fuse for lamp 43 and is thus of greater electrical resistance than any of the remaining conductive members, article 17, having an even lower resistance, is fully acceptable for use within the lamp.

Thus there has been shown and described a composite metallic article for effecting a vacuum seal to glass. The article as defined is less expensive to manufacture than known composite glass sealing components such as "Dumet" and further includes the desired feature of having substantially smaller differentials between radial and axial expansion than said products. When using the preferred materials as defined, the article assures a means whereby a more positive bond between the core and sheath are maintained.

While there has been shown and described what are at present considered the preferred embodiments of the invention, it will be obvious to those skilled in the art that various changes and modifications may be made therein without departing from the scope of the invention as defined by the appended claims.

What is claimed is:

1. A glass to metal seal of a metallic composite, said composite comprising:
   a central core portion of a wrought nickel-iron alloy wherein said nickel comprises about 42 percent by weight of said core with the balance iron;
   a substantially uniformly thick sheath portion of a low carbon steel alloy bonded about said core portion; and
   a substantially uniformly thick shell portion of a glass wetting metal bonded about said sheath portion, said composite having an average coefficient of thermal expansion within the range of from about 7.5 to about 10.0 cm/cm/° C$\times 10^{-6}$ over a temperature range of from about 25° C to about 400° C.

2. The article according to claim 1 wherein said sheath portion comprises from about 15 to about 35 percent by weight of said article.

3. The article according to claim 1 wherein said shell portion comprises from about 2 to about 7 percent by weight of said article.

4. The article according to claim 1 wherein said core portion is produced from prealloyed nickel and iron powder.

5. The article according to claim 1 wherein said steel alloy is of the plain carbon variety.

6. The article according to claim 1 wherein said glass wetting metal is copper.

7. The article according to claim 5 wherein said plain carbon steel alloy contains about 0.10 or less percent by weight carbon.

* * * * *